(12) United States Patent
Jobson

(10) Patent No.: US 7,152,407 B2
(45) Date of Patent: Dec. 26, 2006

(54) THERMAL ENERGY RECOVERY DEVICE

(75) Inventor: Edward Jobson, Romelanda (SE)

(73) Assignee: Volvo Technology Corporation, Göteborg (SE)

( * ) Notice: Subject to any disclaimer, the term of this patent is extended or adjusted under 35 U.S.C. 154(b) by 0 days.

(21) Appl. No.: 10/249,394

(22) Filed: Apr. 4, 2003

(65) Prior Publication Data
US 2003/0213242 A1 Nov. 20, 2003

Related U.S. Application Data

(63) Continuation of application No. PCT/SE01/02076, filed on Sep. 27, 2001, now abandoned.

(30) Foreign Application Priority Data

Oct. 4, 2000 (SE) .................................... 0003580

(51) Int. Cl.
F01K 23/06 (2006.01)
(52) U.S. Cl. .............................. 60/604; 60/614; 60/616
(58) Field of Classification Search ................ 165/140, 165/DIG. 399, 51; 60/274, 599, 604, 616, 60/597, 618, 614, 623, 624, 653, 655
See application file for complete search history.

(56) References Cited

U.S. PATENT DOCUMENTS

| | | | | |
|---|---|---|---|---|
| 1,813,543 A | * | 7/1931 | Pescara | 60/616 |
| 3,350,876 A | * | 11/1967 | Johnson | 60/618 |
| 3,525,390 A | * | 8/1970 | Rothman | 165/140 |
| 3,893,300 A | * | 7/1975 | Connell | 60/683 |
| 3,910,042 A | | 10/1975 | Yuge et al. | |
| 3,986,575 A | * | 10/1976 | Eggmann | 60/616 |
| 4,148,357 A | * | 4/1979 | Forster et al. | 165/140 |
| 4,407,357 A | * | 10/1983 | Hultgren | 165/DIG. 399 |
| 5,000,003 A | * | 3/1991 | Wicks | 60/618 |
| 5,033,264 A | * | 7/1991 | Cabral | 60/274 |
| 5,351,487 A | * | 10/1994 | Abdelmalek | 60/618 |
| 5,685,145 A | * | 11/1997 | Sung et al. | 60/284 |
| 5,687,565 A | | 11/1997 | Modica et al. | |
| 5,700,434 A | | 12/1997 | Gaiser | |
| 5,916,129 A | * | 6/1999 | Modica et al. | 60/274 |
| 6,119,457 A | * | 9/2000 | Kawamura | 60/618 |
| 6,178,744 B1 | * | 1/2001 | Perset | 60/298 |
| 6,207,116 B1 | * | 3/2001 | Heed | 422/173 |
| 6,543,229 B1 | * | 4/2003 | Johansson | 60/605.1 |
| 6,564,545 B1 | * | 5/2003 | Dong | 60/298 |

FOREIGN PATENT DOCUMENTS

JP 54121320 A * 9/1979
WO WO 9937897 A1 7/1999

* cited by examiner

Primary Examiner—Hoang Nguyen
(74) Attorney, Agent, or Firm—Novak Druce & Quigg, LLP

(57) ABSTRACT

Device (1) for the recovery of thermal energy from a first gas flow (11) from an internal combustion engine (10), the device being designed for the transfer of thermal energy from the first gas flow (11) to a second gas flow (12). The device includes a body (2) having a zigzag-shaped structure, which forms ducts for said gas flows, and the body (2) is designed for the transfer of heat between the first gas flow (11) and the second gas flow (12).

28 Claims, 2 Drawing Sheets

THERMAL ENERGY RECOVERY DEVICE

CROSS REFERENCE TO RELATED APPLICATIONS

The present application is a continuation patent application of International Application No. PCT/SE01/02076 filed Sep. 27, 2001 which was published in English pursuant to Article 21(2) of the Patent Cooperation Treaty and which claims priority to Swedish Patent Application No. 0003580-8 filed Oct. 4, 2000. Both applications are expressly incorporated herein by reference in their entireties.

BACKGROUND OF INVENTION

1. Background of the Invention

The present invention relates to a device for the recovery of thermal energy from a first gas flow from an internal combustion engine that is designed for the transfer of thermal energy from the first gas flow to a second gas flow. The invention is particularly intended in for incorporation with an internal combustion engine in a vehicle, such as a truck, but can also be used in stationary, fixed internal combustion engines.

2. Background Art

Using a device to recover thermal energy in exhaust gases from an internal combustion engine in a truck is known. The hot exhaust gases from the engine are fed into the device in a first gas flow. A second gas flow, usually an air flow, is also fed into the device. The two gas flows are made to exchange heat with one another and the air flow heated after the heat exchange is then made to expand in a turbine wheel. The energy transferred from the exhaust gases is used, for example, for the compression of an air inlet flow to the engine.

Such a thermal energy recovery device has a potentially high efficiency, but it has proved difficult to manufacture such a device in a way that is sufficiently cost-effective for commercial production.

SUMMARY OF INVENTION

One objective of the present invention is to produce a device for recovering the energy in a gas flow from an internal combustion engine that creates the prerequisites for a cost-effective application thereof in an exhaust gas system. Another objective of the invention is to produce a device for recovering the energy in a gas flow from an internal combustion engine, which creates the prerequisites for the cost-effective replacement of an existing unit in a vehicle with exchange of heat between two gas flows.

These objectives are achieved by way of the device comprising (including, but not being limited to) a body with a zigzag-shaped structure that forms ducts for said gas flows. The body is designed for the transfer of heat between the first gas flow and the second gas flow. Such a body can be manufactured cost effectively, preferably by bending a strip-shaped element to form the zigzag-shaped structure.

According to a preferred embodiment, the body is designed for heat exchange in at least two stages; that is, a first stage between the first gas flow and an intermediate gas flow, and a second stage between the intermediate gas flow and the second gas flow. An unit in an exhaust gas system for the exchange of heat between the two gas flows can thereby be replaced by the instant device. More specifically, the gas flows can be led through the device in such a way that the first heat exchange stage replaces the first and second heat exchange stages and is utilized for energy recovery.

According to a second preferred embodiment, the device is designed for leading a first gas along a path such that it forms both a first and an intermediate gas flow. That is to say, the first gas flow is led in such a way that it exchanges heat with itself. A heat exchanger unit that is situated in an exhaust gas system, and in which such an exchange of heat occurs, can thereby be replaced by a device configured according to the invention.

According to another preferred embodiment, the thermal energy recovery device of the presently disclosed invention (s) contains a catalytic material for the catalytic treatment of a first gas, which forms the first gas flow. The prerequisites are thereby created for replacing a catalytic converter containing a heat exchanger unit, which forms part of an exhaust gas system, with the device according to the invention.

According to another preferred embodiment the device comprises a casing, which encloses the body and has inlets and outlets for the gases. The device furthermore comprises means for transferring energy from a second gas, which forms the second gas flow, to a rotatable element, the means of energy transfer being connected to an outlet in the casing for the second gas. The means of energy transfer can consist of, for example, a compressor and an expander.

BRIEF DESCRIPTION OF DRAWINGS

The invention will be described in greater detail below with reference to the embodiments shown in the attached drawings in which.

DETAILED DESCRIPTION

Figure 1:
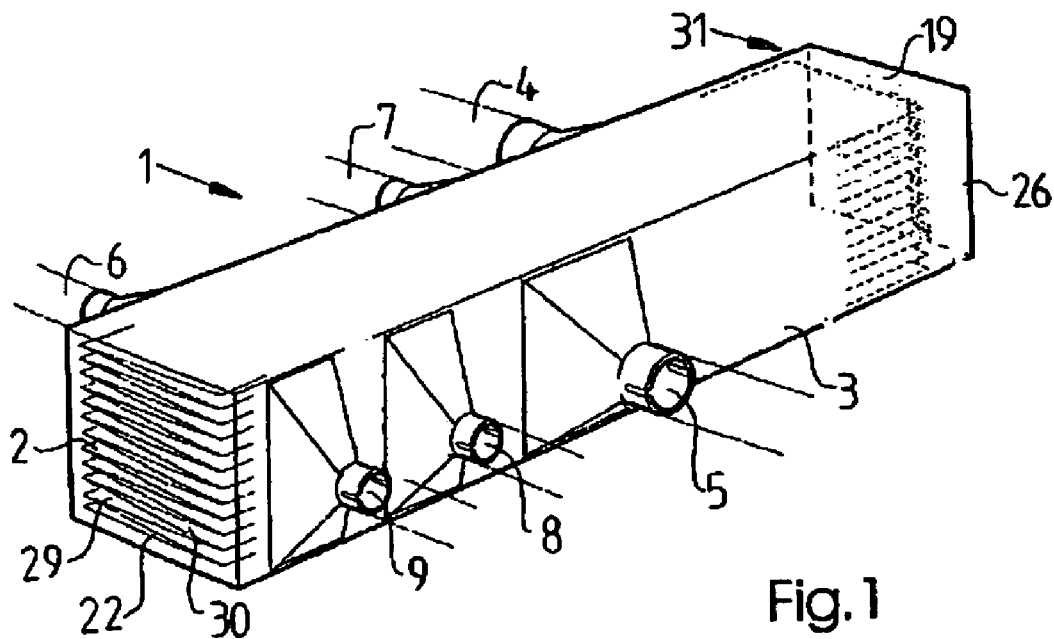
FIG. 1 shows a diagrammatical, partially transparent perspective view of a thermal energy recovery device configured according to the teachings of a first embodiment of the present invention.
Figure 2:
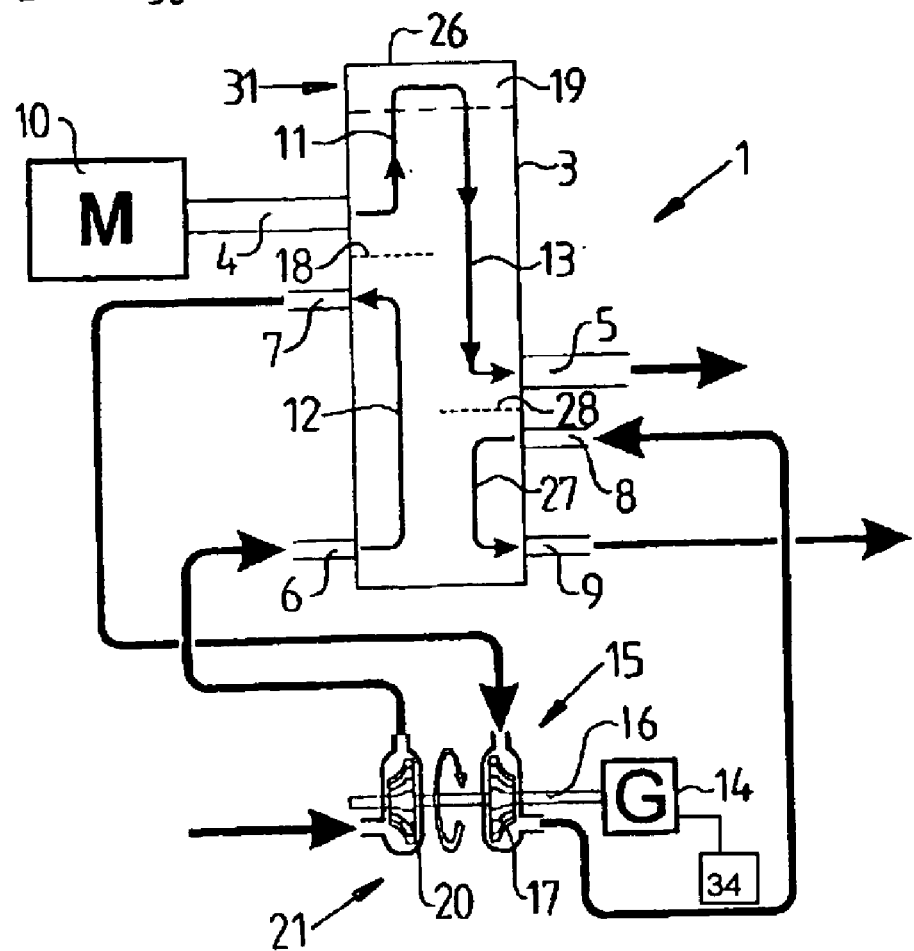
FIG. 2 shows a schematic diagram of the directions of flow of the gases in connection with the thermal energy recovery device exemplified in FIG. 1.

FIGS. 1 and 2 illustrate a device or apparatus 1 for the recovery of thermal energy from exhaust gases from an internal combustion engine 10. The device 1 comprises (includes, but is not limited to) a body 2, that defines a plurality of ducts 29, 30 for leading the gas flows in such a way that there is an exchange of heat between them. A casing 3 encloses the body 2. The casing 3 has a plurality of openings 4–9 for the admission of gases to, and the removal of gases from, the body 2.

The heat recovery is intended to occur through heat transfer from a first gas, that is the exhaust gases, which define a first gas flow 11, to a second gas flow 12, which consists, for example, of an air flow. Thereafter it is intended that energy from the heated air (second gas flow 12) be transmitted to an energy conversion element in the form of a generator 14 by a means of energy transfer 15. The means of energy transfer 15 exemplarily comprises a turbine wheel 17 fixed to a rotatable element 16 and that is designed to be driven by the expansion of the air (gas). The rotatable element 16 includes a shaft and is also coupled to the generator 14.

Figure 3:
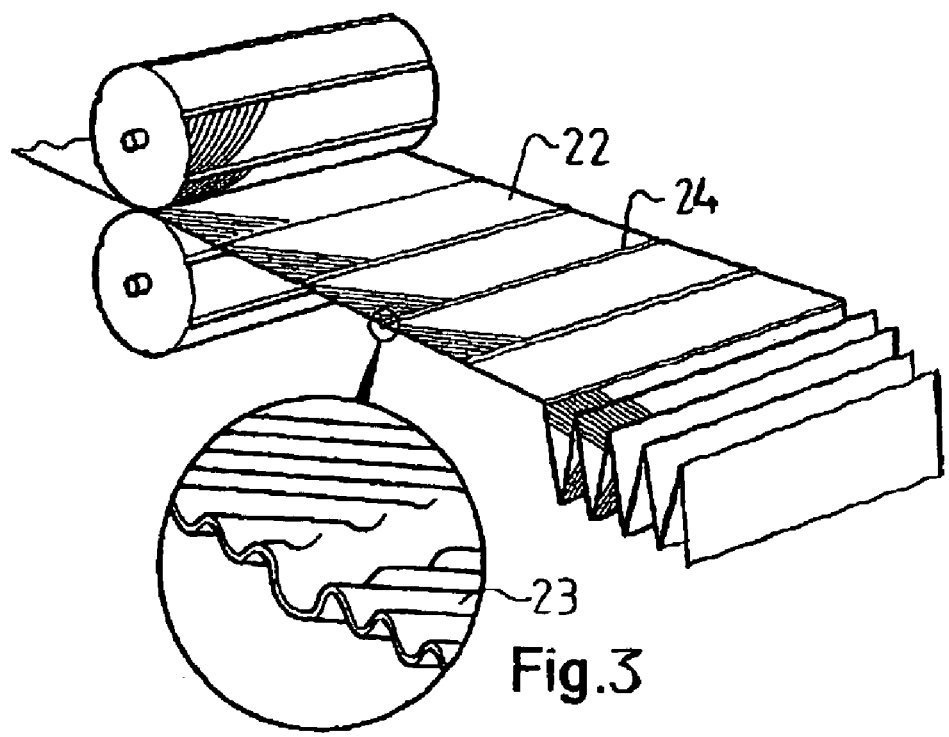
FIG. 3 is a perspective view that illustrates the manufacture of a body forming part of the thermal energy recovery device.

The body 2 comprises a strip-shaped element 22, which is folded to form a zigzag-shaped structure, which forms the alternating ducts 29,30 for the exchange of heat between the ducts (see also FIG. 3). For the sake of simplicity, the strip-shaped element 22 will hereinafter be referred to as the strip.

Exhaust gases from the internal combustion engine 10 are fed into the device through a first inlet 4 and out through a first outlet 5. The exhaust gases are led through the device in such a way that during an initial stage of their passage the exhaust gases exchange heat with the exhaust gases during a later stage of their passage before the exhaust gases exchange heat with the second gas flow. In other words, in a first stage, heat is exchanged between a first gas flow 11, made up of the exhaust gases, and an intermediate gas flow 13, also made up of the exhaust gases. In a second stage, heat is exchanged between the intermediate gas flow 13 and the second gas flow 12. The passage of the exhaust gases follows a reciprocating path and the gas flows 11,12 are led essentially parallel, but in opposite directions. The terms first and second stage do not refer to any timing in relation to one another, the two heat exchange stages occurring simultaneously during operation of the device. The term intermediate refers to the position of this flow with respect of the heat transfer between the first and second gas flow. The term intermediate is therefore not confined to a specific geometric position in relation to the first and second flow.

The device is designed to lead the first gas flow 11 and second gas flow 12 in succeeding sections of the body 2 in the longitudinal direction of the ducts and the intermediate flow 13 parallel thereto. This creates a device that makes effective use of the available space. The device 1 contains a catalytic material for catalytic treatment of the exhaust gases. The catalytic material is arranged on at least some of the walls of the body 2 defining the ducts intended for the exhaust gases. A heat exchanger unit and a catalytic converter can thereby be said to be integrated into the thermal energy recovery device. The catalytic characteristics of the device 1 are explained in greater detail below.

The first inlet 4 and the first outlet 5 are arranged on opposite sides of the body 2 in the form of the zigzag-shaped structure and open opposite ducts separated from one another on opposite sides of the strip 22. The first inlet 4 is arranged at an interval from the first outlet 5 in the longitudinal direction of the ducts. More specifically, the first inlet 4 is arranged at a shorter distance, in the longitudinal direction of the ducts, from a section 31 of the device, in which the exhaust gases are intended to return, than is the first outlet 5. The heat exchange between the first gas flow 11 and intermediate gas flow 13 can therefore take place between the first inlet 4 and said return section 31 for the gas in the longitudinal direction of the ducts.

A short side wall 26 of the casing 3 is arranged at a distance from the body 2 in a section thereof into which the ducts for the first gas open. A chamber 19 is thereby formed between the side wall 26 and the body 2, in which chamber the first gas is allowed to change direction.

A second gas, such as air, is fed into the device 1 through a second inlet 6 and out of the device through a second outlet 7. This second gas defines the second gas flow 12. The second gas flow 12 is led essentially parallel to the intermediate flow 13 and in the opposite direction. The body 2 has elements 18 for separation of the first gas flow 11 and second gas flow 12, the elements being arranged in the ducts between the first inlet 4 and second outlet 7. The separating elements 18 are indicated by a dashed line in FIG. 2. The separating elements divide each of the spaces situated between the strip layers of the body 2 into two ducts. The separating elements 18 are suitably produced by applying a bead of a sealing material between the strip layers during manufacture of the body 2.

The second outlet 7 is arranged between the first inlet 4 and the outlet 5 in the longitudinal direction of the ducts. The heat exchange between the intermediate gas flow 13 and the second gas flow 12 can thereby take place between the first outlet 5 and the second outlet 7 in the longitudinal direction of the ducts.

The function of the thermal energy recovery device 1 is explained below. The air is fed into a compressor wheel 20 in a turbo unit 21, compressed and led on to the second inlet 6. Heat is exchanged between the second flow 12 defined by the air and the intermediate flow 13, defined by the exhaust gases, and the air is then led out through the second outlet 7. The now heated air is then fed to the turbine wheel 17 in the turbo unit 21, where it is made to expand. The shaft 16 fixed to the turbine wheel 17 is thereby made to rotate and the energy is utilized in the generator 14. The shaft 16 is also fixed to the compressor wheel 20. In this way the compressor wheel 20 is also driven by the turbine wheel 17.

The strip 22 forms a so-called membrane, which separates various gas flows. The membrane is designed in such a way that heat can be transmitted from a gas flow on one side of the strip to a gas flow on the other side of the strip, but gases cannot flow freely through the membrane. For the catalytic function, the membrane is preferably arranged in such a way that the heat exchange takes place in a countercurrent process, in which the coolest part of the outlet gas heats the incoming gas just as the latter is entering, while at the same time the hotter, not yet cooled part of the outflowing gas heats the incoming gas at a later stage. This results in good efficiency.

For efficient heat transfer, the gas must also have a good transfer contact with the surface of the strip. According to the invention, the strip is covered with a layer of a suitable catalytic material, which also produces a good contact with the gas, which in turn creates advantageous conditions for achieving a high rate of conversion. A close contact between the gas and the walls is desirable.

The strip 22 consists, for example, of a thin metal plate, made of stainless steel, for example, which is coated with a thin layer of a catalytic material. The strip could also be made of a ceramic material, which is impregnated or coated with a catalytic material. Either both sides, or just one side of the strip may be coated with the catalytic material. Selected parts of the strip are covered with a layer of a suitable catalytic material. The catalytic material may be applied, for example, intermittently or as a continuous layer.

The catalytic material is applied in the ducts, in which the first gas is intended to flow. The catalytic coating is therefore arranged in the ducts for the first gas flow and/or in the ducts for the intermediate flow.

For efficient heating of a flowing gas, the surface of the strip is of a textured nature as shown in FIG. 3. The surface has a plurality of elevations and depressions 23, such as a ridge-and-valley formation. The strip is suitably corrugated. This produces a certain amount of turbulence in the gas flow. The corrugation of the strip is produced, for example, by pressing, rolling, or some such method, see FIG. 3. The corrugations preferably run at an angle of 45–60 degrees over the strip. The strip is then bent in a zigzagged, corrugated manner. The corrugations in adjoining layers are arranged crosswise in relation to one another and serve as spacers between the layers of the strip. In order to facilitate bending of the element, the corrugation pattern may be interrupted by fold lines 24 running perpendicular to the longitudinal direction of the element. Those parts of the strip situated between the fold lines have a rectangular shape.

Examples of materials that can be used as catalytic material are precious metals, such as platinum, rhodium or palladium. Preferably, metals of the platinum group are used. Certain types of metal oxides may also be used.

The ducts 29,30 formed by the strip 22 occur in column form. The strip sections defining each duct are essentially parallel, but there is a certain angular difference in order to permit said zigzag shape. That is to say, the strip forms plates or layers, which define the ducts.

The casing 3 has a third inlet 8 to the body 2 for the expanded air from the turbine wheel 17. The casing 3 also has a third outlet 9 for the removal of air from the body 2. The air defines a third gas flow 27 between the inlet 8 and the outlet 9. The device 1 is designed for the exchange of heat between the second gas flow 12 and the third gas flow 27. This is intended for the transmission of thermal energy from the third gas flow 27 to the second gas flow 12. This third heat exchange stage in the device 1 creates the prerequisites for an increased efficiency. The third inlet 8 and the outlet 9 are arranged on an opposite side of the casing to the second inlet 6 and the outlet 7. The inlets 6,8 and the outlets 7,9 are arranged in such a way that heat exchange between the third gas flow 27 and second gas flow 12 takes place in a countercurrent process. The body 2 has elements 28 for separating the second and fourth gas flow, the elements being arranged in the ducts between the third inlet and the first outlet. The separating elements 28 are preferably of the same type as the separating elements 18 described above.

Figure 4:
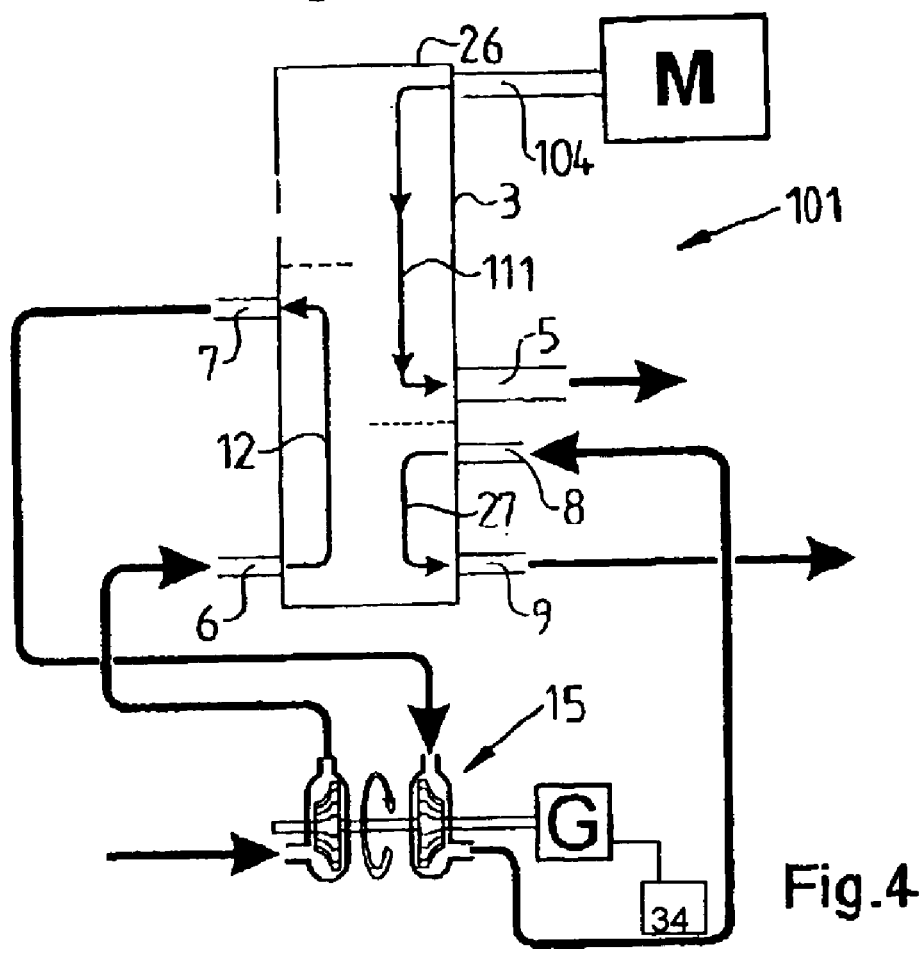
FIG. 4 shows a schematic diagram of the directions of flow of gases in connection with a thermal energy recovery device configured according to a second embodiment of the present invention.

FIG. 4 illustrates a second embodiment of the thermal energy recovery device, which is a variant of the first embodiment. Here, the device has the reference number 101. This embodiment differs from the first embodiment in that a first gas flow 111 exchanges heat directly with the second gas flow 12. The device 101 is thereby designed for heat exchange between the first gas flow 111 and the second gas flow 12. There is therefore no two-stage exchange of heat between the first gas flow, an intermediate gas flow and the second gas flow.

In a section intended for heat exchange, the device 101 is designed to lead the first gas flow 111 in an essentially opposite direction to the second gas flow 12. The device 101 is designed to lead the first gas flow 111 and third gas flow 27 in succeeding sections of the body 2 in the longitudinal direction of the ducts 29,30 and the second flow 12 parallel thereto.

A first inlet 104 for admission of the first gas is arranged in proximity to the short side wall 26 of the casing 3. The inlet 104 preferably opens on an opposite side of the body 2 to the second outlet 7.

Although the ducts in the thermal energy recovery device according to the embodiments shown are both parallel and essentially rectilinear, the term parallel also includes curved ducts. In the preferred embodiments the ducts are defined both by the body 2 and by the casing 3.

Gases other than air may be used for the transfer of heat. For example, a closed system may be used for the gas. The gas should afford a large volume expansion for a specific increase in temperature at a given pressure. One example of such a group of gases are noble gases; helium being especially preferred.

The generator 14 can be suitably coupled to an energy storage element 34, such as a battery, in which the energy is stored. The generator may also be replaced by some other type of energy conversion element, such as a compressed air compressor or pneumatic compressor.

The ducting of the gas flows by the body is aimed at controlling these.

The device 1 is well-suited to the catalytic oxidation of organic substances such as hydrocarbons. In addition to the oxidation of organic substances, the device is also well-suited to other combined heat exchange and catalytic treatment of gases, such as the so-called selective reduction of nitrogen oxides with ammonia or other reducing nitrogen compounds. The device is well suited to the treatment of engine exhaust gases regardless of whether they have a high oxygen content (diesel engines) or low oxygen content (petrol engines).

According to an alternative exemplary embodiment, the means of energy transfer includes two piston pumps arranged on the same shaft, one for expansion and one for compression. According to an alternative to the latter exemplary embodiment, the respective piston pump is replaced by a diaphragm pump.

The body 2 may also be manufactured by some method other than said bending of the strip 22; for example, by extrusion.

The invention claimed is:

1. An apparatus for recovering thermal energy comprising a heat transfer device that transfers thermal energy from an exhaust gas flow of an internal combustion engine to a second gas flow that powers an energy conversion element, each of said gas flows being conveyed through respective ducts formed at least partially in a body of said device and wherein said body exchanges heat in at least two stages, a first heat exchange stage in which heat is exchanged between the exhaust gas flow and an intermediate gas flow, and a second heat exchange stage in which heat is exchanged between the intermediate gas flow and the second gas flow.

2. The apparatus as recited in claim 1, further comprising said body leading the exhaust gas flow along a path such that the exhaust gas flow forms both the first gas flow and the intermediate gas flow.

3. The apparatus as recited in claim 1, wherein said device is configured so that the first heat exchange stage in which the first gas flow is lead in an essentially opposite direction to the intermediate gas flow.

4. The apparatus as recited in claim 1, wherein said device is configured so that the second heat exchange stage in which the intermediate gas flow is lead in an essentially opposite direction to the second gas flow.

5. The apparatus as recited in claim 1, wherein said device is configured to lead the exhaust gas flow and the second gas flow in succeeding sections of the body in a longitudinal direction of the ducts and with the intermediate flow parallel thereto.

6. The apparatus as recited in claim 1, wherein said device is configured to exchange heat between the second gas flow and a third gas flow.

7. The apparatus as recited in claim 1, wherein said device is configured to lead the intermediate gas flow and a third gas flow in succeeding sections of the body in a longitudinal direction of the ducts and with the second flow parallel thereto.

8. An apparatus for recovering thermal energy comprising a heat transfer device that transfers thermal energy from an exhaust gas flow of an internal combustion engine to a second gas flow, each of said gas flows being conveyed in an essentially opposite direction through respective ducts formed from a strip-shaped element configured by folds into a zigzag-shaped structure, said strip-shaped element forming said ducts, and said strip-shaped element being applied with catalytic material to at least one wall of the exhaust duct, and said apparatus further comprising an energy conversion element that is powered by the heated second gas flow.

9. An apparatus for recovering thermal energy comprising a heat transfer device that transfers thermal energy from an exhaust gas flow of an internal combustion engine to a second gas flow that powers an energy conversion element, said exhaust gas flow being conveyed through an exhaust duct and said second gas flow being conveyed through a second gas duct, said exhaust duct and said second gas duct being formed at least partially in a body of said device, said exhaust duct and said second gas duct being defined for leading the exhaust gas flow and the second gas flow such that said thermal energy transfer takes place between the exhaust duct with the exhaust gas flow and the second duct with the second gas flow, the exhaust gas flow is lead in an essentially opposite direction to the second gas flow, and said exhaust duct for said exhaust gas flow comprising a catalyst arranged for treating said exhaust gas flow, such that said apparatus for recovering thermal energy comprises an a heat transfer device being integrated with a catalyst and an energy conversion element.

10. The apparatus as recited in claim 9, wherein the device further comprises a casing that encloses the body and has inlets and outlets for gases.

11. The apparatus as recited in claim 9, wherein the device further comprises a side wall of the casing that is arranged at a distance from the body in a section thereof and into which the ducts for the first gas open, a chamber being formed between the side wall and the body, in which chamber the first gas is allowed to change direction.

12. The apparatus as recited in claim 11, wherein said energy conversion element further comprises a means for transfering energy from a second gas that forms the second gas flow, to a rotatable element, the energy transfer means being connected to an outlet in the casing for the second gas.

13. The apparatus as recited in claim 12, wherein the energy transfer means further comprises a turbine wheel, coupled to the rotatable element, for expansion of the second gas.

14. The apparatus as recited in claim 13, wherein said energy conversion element is coupled to the rotatable element.

15. The apparatus as recited in claim 13, wherein the device further comprises a compressor wheel connected to an inlet of the casing for the second gas, the compressor wheel being designed for compression of the second gas, and the compressor wheel being fixed to the turbine wheel.

16. The apparatus as recited in claim 13, wherein the device is configured to exchange heat between the second gas flow and a third gas flow, which third gas flow is formed by the second gas after said expansion.

17. An apparatus according to claim 9, wherein the catalytic material is applied to at least one wall of the exhaust duct.

18. An apparatus according to claim 17, wherein the catalytic material is applied as a layer on said at least one wall of the exhaust duct.

19. An apparatus according to claim 18, wherein the layer of catalytic material is intermittent or continuous.

20. An apparatus according to claim 9, wherein the exhaust gas duct and the second gas duct are configured so that the exhaust gas flow is lead in an essentially opposite direction to the second gas flow.

21. An apparatus according to claim 9, wherein said energy conversion element utilises compression/expansion of a gas flow to recover energy.

22. An apparatus according to claim 9, wherein said energy conversion element generates energy for an energy storage device.

23. An apparatus for recovering thermal energy comprising a heat transfer device that transfers thermal energy from an exhaust gas flow of an internal combustion engine to a second gas flow that powers an energy conversion element, said exhaust gas flow being conveyed through an exhaust duct and said second gas flow being conveyed through a second gas duct, said exhaust duct and said second gas duct being formed at least partially in a body of said device, said exhaust duct and said second gas duct being configured for leading the exhaust gas flow and the second gas flow such that said thermal energy transfer takes place between the exhaust duct with the exhaust gas flow and the second duct with the second gas flow, and the exhaust gas flow is lead in an essentially opposite direction to the second gas flow, said exhaust duct for said exhaust gas flow comprises a catalyst arranged for treating said exhaust gas flow, the catalytic material being applied to at least one wall of the exhaust duct, such that said apparatus for recovering thermal energy comprises a heat transfer device being integrated with a catalyst and an energy conversion element.

24. An apparatus according to claim 23, wherein the catalytic material is applied as a layer on said at least one wall of the exhaust duct.

25. An apparatus according to claim 24, wherein the layer of catalytic material is intermittent or continuous.

26. An apparatus according to claim 23, wherein said energy conversion element utilises compression/expansion of a gas flow to recover energy.

27. An apparatus according to claim 23, wherein said energy conversion element generates energy for an energy storage device.

28. The apparatus as recited in claim 27, wherein said energy is electrical energy and said storage device is a battery.

* * * * *